United States Patent … Haberl

(10) Patent No.: US 11,787,274 B2
(45) Date of Patent: Oct. 17, 2023

(54) TOP COMPARTMENT LID ASSEMBLY COMPRISING A LINK ASSEMBLY AND A LOCKING ASSEMBLY

(71) Applicant: Webasto SE, Stockdorf (DE)

(72) Inventor: Franz Haberl, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 121 days.

(21) Appl. No.: 17/399,646

(22) Filed: Aug. 11, 2021

(65) Prior Publication Data

US 2022/0048369 A1     Feb. 17, 2022

(30) Foreign Application Priority Data

Aug. 13, 2020  (DE) ............... 10 2020 121 341.7

(51) Int. Cl.
*B60J 7/185*     (2006.01)
*B60J 7/14*      (2006.01)

(52) U.S. Cl.
CPC ............. *B60J 7/143* (2013.01); *B60J 7/185* (2013.01)

(58) Field of Classification Search
CPC ..... B60J 7/143; B60J 7/19; B60J 7/196; B60J 7/1856; B60J 7/185; B60J 7/205; B60J 7/1692; B60J 7/1855; B60J 7/1858; B60J 7/201
USPC ..................... 296/107.16, 107.08, 107.17
See application file for complete search history.

(56) References Cited

U.S. PATENT DOCUMENTS

| 3,343,303 A | 9/1967 | Wanlass |
| 4,333,269 A | 6/1982 | Bascou |
| 7,261,363 B2 | 8/2007 | Obendiek |
| 2002/0105205 A1* | 8/2002 | Willard ............... B60J 7/1692 296/107.17 |
| 2005/0248177 A1* | 11/2005 | Obendiek ............ B60J 7/205 296/76 |
| 2010/0164255 A1* | 7/2010 | Hinrichs ............. E05B 79/20 296/224 |

(Continued)

FOREIGN PATENT DOCUMENTS

| DE | 102006005367 A1 * | 8/2007 | ......... B60J 1/1823 |
| DE | 102011112814 A1 * | 3/2013 | ............ B60J 7/12 |

(Continued)

OTHER PUBLICATIONS

Lange et al. DE102011112814A1, machine translation, EPO, Mar. 14, 2013 (Year: 2013).*

*Primary Examiner* — Amy R Weisberg
*Assistant Examiner* — Wenwei Zhuo
(74) *Attorney, Agent, or Firm* — Quarles & Brady LLP

(57) ABSTRACT

A top compartment lid assembly of a convertible vehicle includes a lid element, a linkage assembly configured to displace the lid element between an open position and a closed position and comprising a lid link assembly on either side of a vertical longitudinal center plane of the lid, each lid link assembly being mounted in a pivoting manner on a main bearing attached to a vehicle body, and a locking assembly on either side of the longitudinal center plane of the lid, each locking assembly being configured to be moved between a locked position and an unlocked position by a locking link assembly. An electric motor is mounted on each of the bilaterally disposed main bearings, each electric motor driving both the respective lid link assembly and the respective locking link assembly via a drive pinion.

12 Claims, 8 Drawing Sheets

(56) References Cited

U.S. PATENT DOCUMENTS

2010/0223851 A1* 9/2010 Odoi ..................... B60J 7/1855
                                                                       49/340

FOREIGN PATENT DOCUMENTS

| DE | 102017121577 A1 * | 3/2019 | ................ B60J 7/20 |
| DE | 102017121580 A1 * | 3/2019 | ................ B60J 7/20 |

* cited by examiner

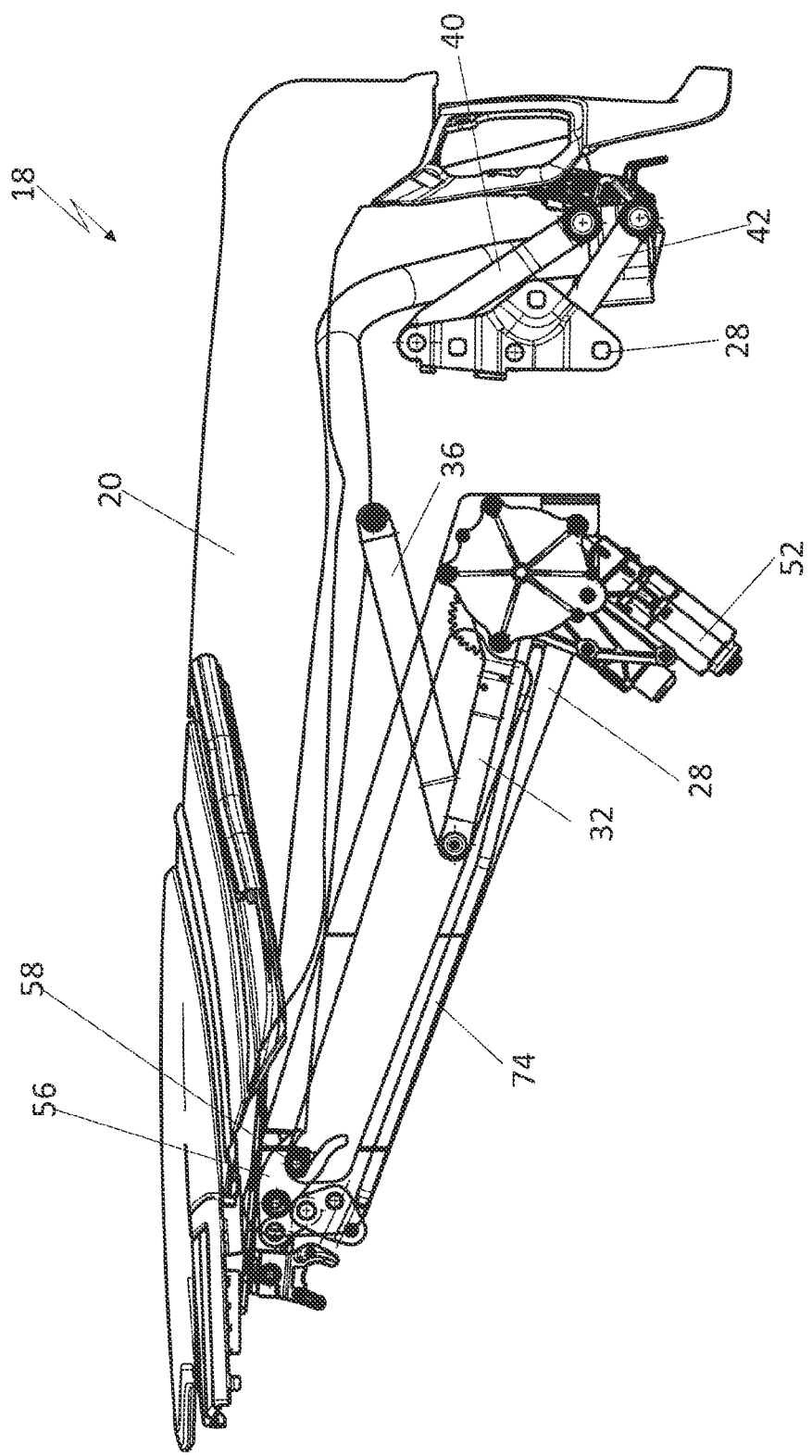

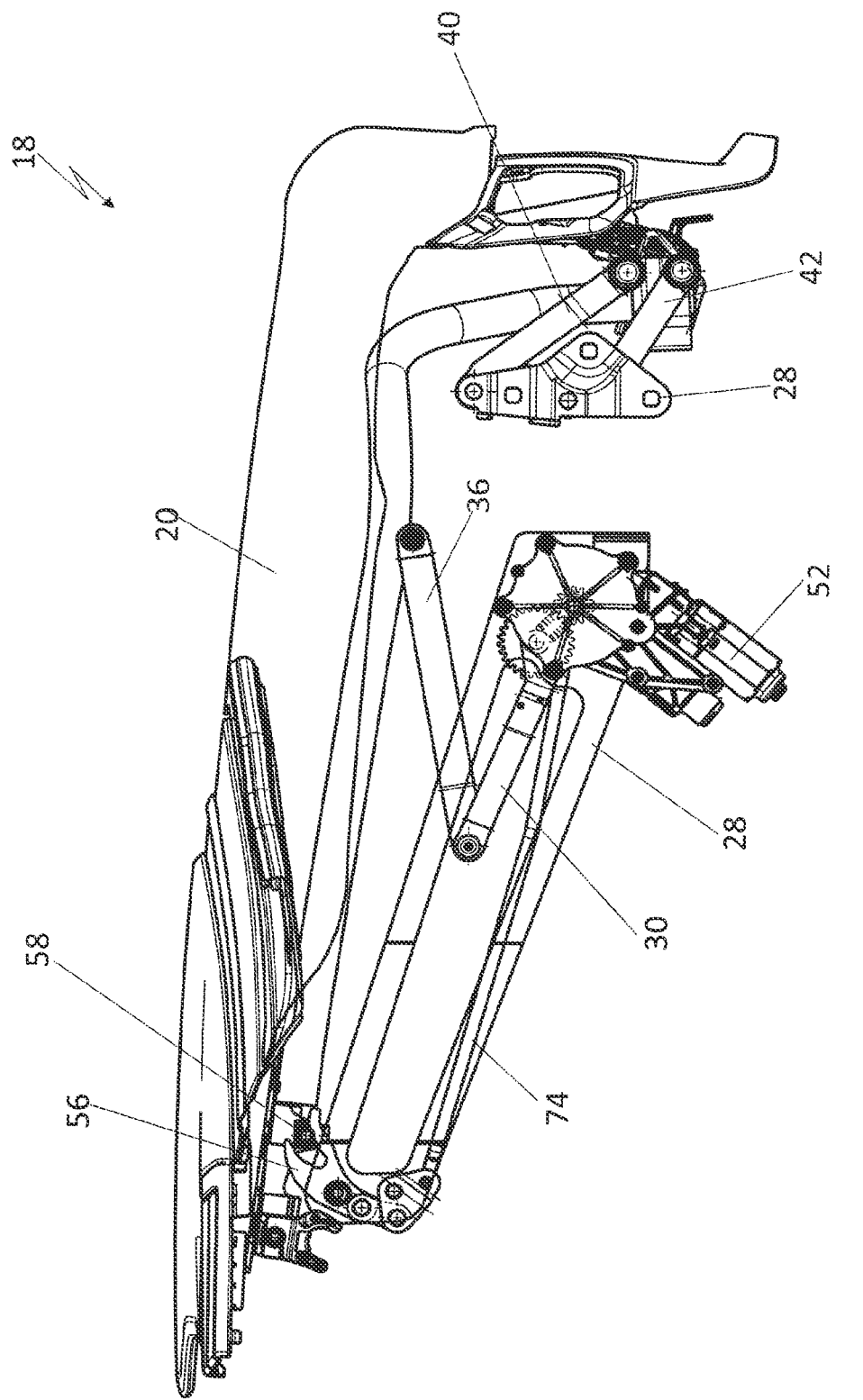

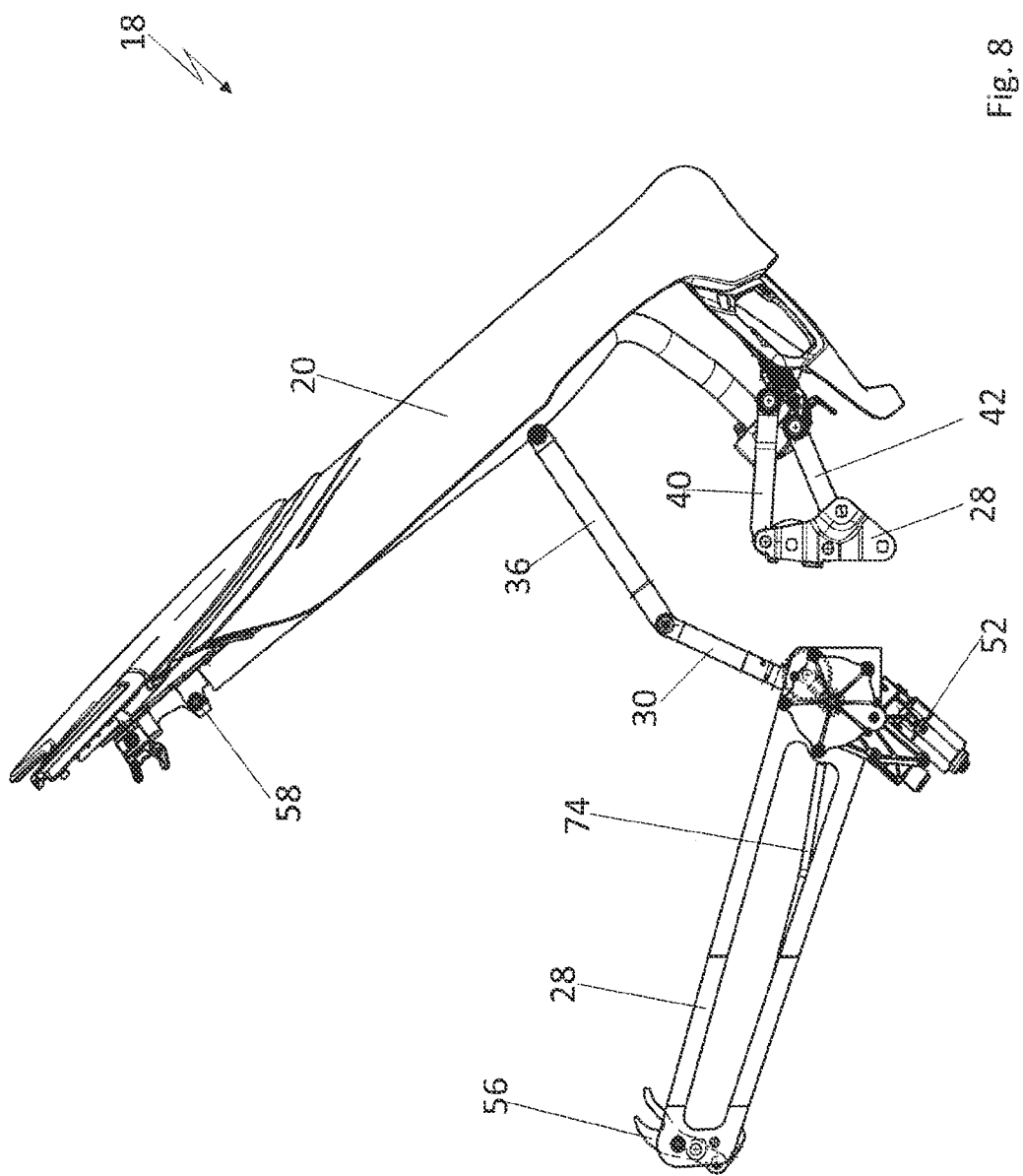

TOP COMPARTMENT LID ASSEMBLY COMPRISING A LINK ASSEMBLY AND A LOCKING ASSEMBLY

CROSS-REFERENCE TO RELATED APPLICATION

This application claims priority to German Patent Application DE 10 2020 121 341.7 filed on Aug. 13, 2020, which is hereby incorporated by reference in its entirety for all purposes.

FIELD OF THE INVENTION

This disclosure relates to a top compartment lid assembly such as for a vehicle.

BACKGROUND

A top compartment lid assembly of this kind is known from practice and serves as a cover of a top compartment which forms a rear top storage space attached to a vehicle for a convertible top which can be displaced between a closed position, in which it covers a vehicle interior, and a storage position, in which it is stored in the top storage space. The top compartment lid assembly comprises a lid element which can be displaced between an open position and a closed position. In the open position, the top storage space is open at the top, allowing the top to be introduced into or removed from the top storage space. For displacing the lid element, the top compartment lid assembly comprises a linkage assembly comprising a lid link assembly on either side of a vertical longitudinal center plane of the lid, each lid link assembly being mounted in a pivoting manner on a main bearing attached to a vehicle body. Additionally, the known top compartment lid assembly comprises a locking assembly by means of which the lid element can be secured in its closed position. The locking assembly can comprise a locking hook which can be moved between a locked position, in which the lid element is secured, and an unlocked position, in which the lid element can be displaced, by means of a locking link assembly. A floating hydraulic cylinder of a hydraulic system serves to move the link assembly of the linkage assembly and the locking link assembly. The hydraulic system has a complex structure and requires very narrow tolerances with regard to the design of the components. This leads to high costs. Alternatively, it is known for the link assembly of the linkage assembly and for the locking link assembly to be provided with separate drives, which is also expensive.

SUMMARY

One object is to provide a top compartment lid assembly which is configured in the manner described above and whose drive of the locking link assembly and of the lid link assembly is configured efficiently and can be realized in an inexpensive manner.

So according to the disclosure, a top compartment lid assembly of a convertible vehicle is proposed which comprises a lid element, a linkage configured to displace the lid element and comprising a lid link assembly on either side of a vertical longitudinal center plane of the lid, each lid link assembly being mounted in a pivoting manner on a respective main bearing attached to a vehicle body, and a locking assembly on either side of the longitudinal center plane of the lid, each locking assembly being configured to be moved between a locked position and an unlocked position by means of a locking link assembly. A common electric motor disposed on the respective body-attached main bearing is provided for moving the lid link assembly and the locking link assembly. The electric motor can drive both the lid link assembly and the locking link assembly by means of a drive pinion. Thus, a common drive for the lid link assembly and the locking link assembly is provided. Elaborate hydraulic systems are unnecessary. Additionally, the electric motor can be fixed to the main bearing. Thus, there is no need for a floating drive means. No installation space for a movement of a drive means has to be provided.

In a specific embodiment of the top compartment lid assembly, the drive pinion first displaces the locking assembly from the locked position into the unlocked position and then displaces the lid element from the closed position into the open position when it is moved in a first direction of rotation, whereas the drive pinion first displaces the lid element from the open position into the closed position and then displaces the locking assembly from the unlocked position into the locked position when it is moved in a second direction of rotation.

In a preferred embodiment of the top compartment lid assembly, the drive pinion drives a coupling wheel which is connected, in particular via a coupling link, to a drive rod of the locking link assembly. The coupling wheel establishes the kinematic connection between the drive pinion and the locking link assembly.

In order to be able to implement a chronological order of the control of the locking link assembly and the lid link assembly, a link of the lid link assembly has a pivot axis which coincides with an axis of rotation of the coupling wheel. Thus, the coupling wheel can at first be turned without moving the lid link assembly.

In order to trigger a movement of the link of the lid link assembly when the coupling wheel is in a particular rotational position, it is advantageous if the coupling wheel has a stop which interacts with the link of the lid link assembly.

The drive rod of the locking link assembly, which can in particular be a push rod, is preferably connected to a link, in particular to a triangular link, which is attached to the vehicle body and mounted in a pivoting manner and which drives a latch of the locking assembly.

In a specific embodiment of the top compartment lid assembly, a pivot axis between the drive rod and the coupling link coincides with an axis of rotation of the drive pinion when the locking assembly is in the unlocked position so that the drive rod is not driven when the lid link assembly is being displaced.

The locking assembly is preferably in an over-center position when it is in its unlocked position so that it cannot be unintentionally displaced into its locked position.

This disclosure also relates to a convertible vehicle comprising a top compartment lid assembly of the kind described above.

A convertible vehicle comprising a top compartment lid assembly is illustrated in the drawing in a schematically simplified manner and will be explained in more detail in the following description.

These and still other advantages of the invention will be apparent from the detailed description and drawings. What follows is merely a description of a preferred embodiment of the present invention. To assess the full scope of the invention, the claims should be looked to as the preferred embodiment is not intended to be the only embodiment within the scope of the claims.

BRIEF DESCRIPTION OF THE DRAWINGS

FIG. 6 is an exterior view of the top compartment lid assembly with the lid element in the closed position;

FIG. 7 is a view of the top compartment lid assembly essentially corresponding to FIG. 6, but for an unlocked position of the locking assembly; and FIG. 8 is a view of the top compartment lid assembly also essentially corresponding to FIG. 6, but for the open position of the lid element.

DETAILED DESCRIPTION

Figure 1:
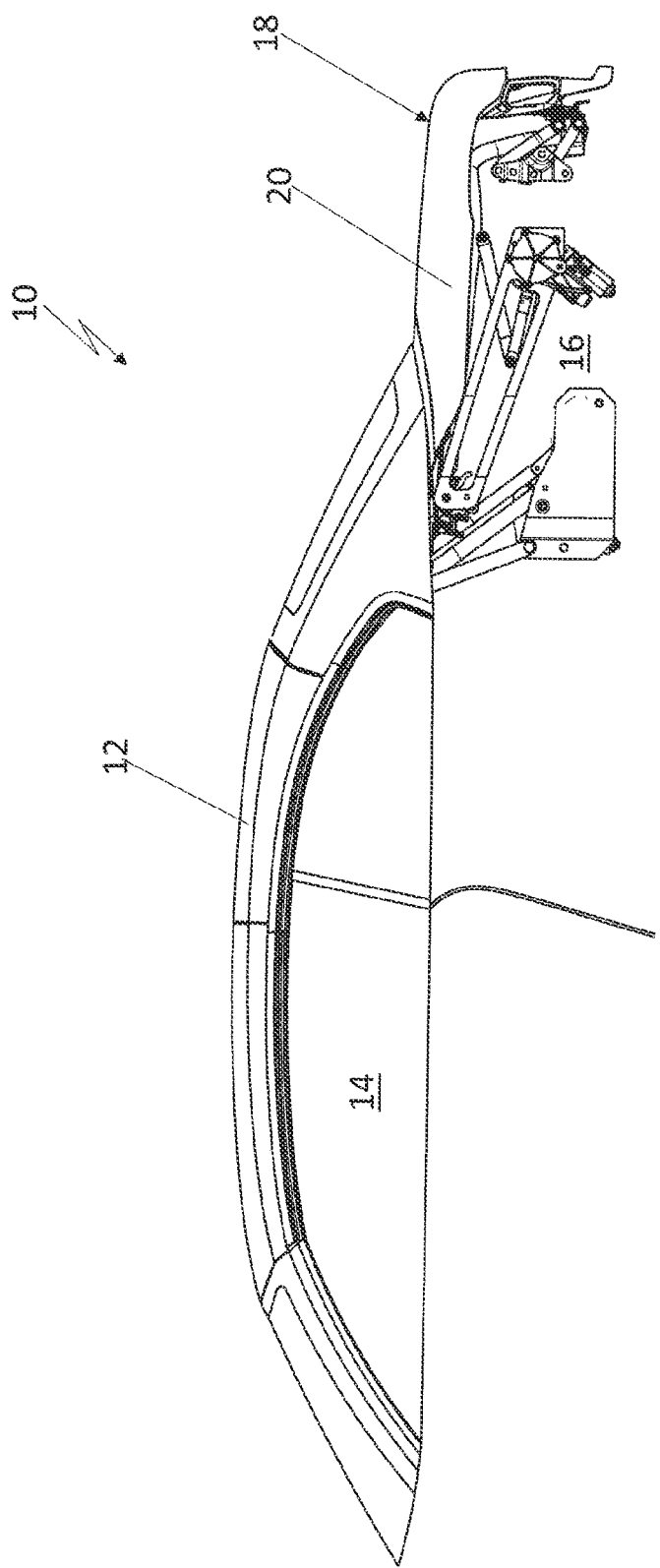
FIG. 1 is a schematic side view of a convertible vehicle comprising a top and a top compartment lid assembly.
Figure 2:
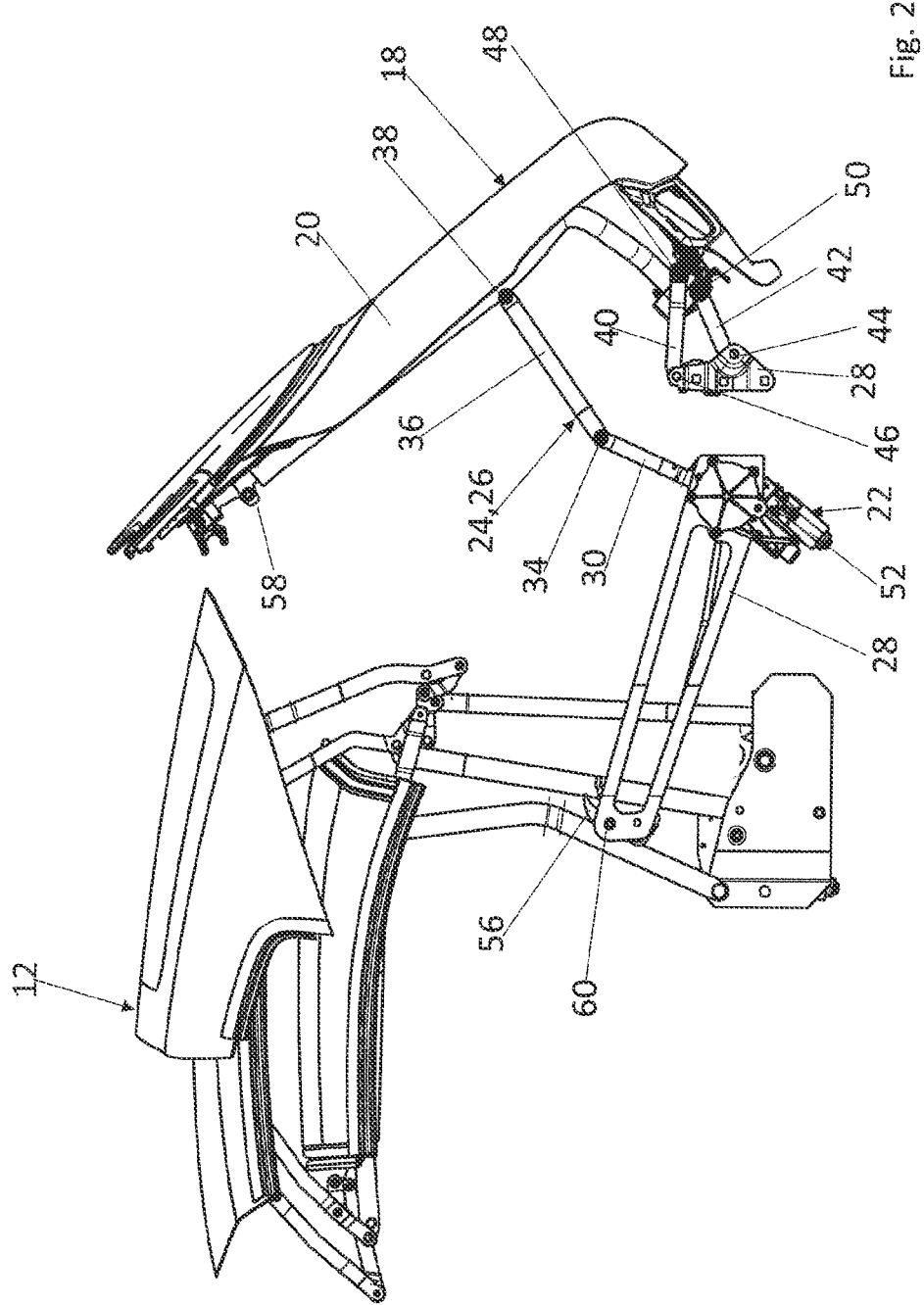
FIG. 2 shows the top in a partially open position and the top compartment lid assembly in an open position.

FIG. 1 shows a convertible vehicle 10, which is provided with a top 12, which is designed as what is known as an RHT (retractable hard top) and which can be displaced between a closed position, which is illustrated in FIG. 1 and in which it covers a vehicle interior 14, and an open position (not shown), in which it is stored in a rear top storage space 16 of convertible vehicle 10. Top storage space 16 is provided with a top compartment lid assembly 18, which is illustrated in more detail in FIGS. 1 to 8 and comprises a lid element 20, which can be displaced between a closed position, which is illustrated in FIG. 1, and an open position, which is illustrated in FIG. 2 and in which top 12 can be removed from top storage space 16 or be introduced into top storage space 16.

In order to be able to displace lid element 20 between its open position and its closed position, top compartment lid assembly 18 has a displacement means 22, which is connected to a controller for displacing top 12, allowing displacement means 22 to be moved as a function of a top displacement process.

Displacement means 22 comprises a linkage assembly 24, which comprises a lid link assembly 26 on either side of a vertical longitudinal center plane of top 12, each lid link assembly 26 being mounted in a pivoting manner on a respective main bearing 28 attached to a vehicle body. Main bearing 28 can be designed as a single part or be composed of multiple parts.

In the case at hand, bilaterally disposed lid link assemblies 26 each comprise a front folding lever comprising a lower link 30, which is hinged to a part of main bearing 28 in a hinge point 32 and connected to an upper link 36 of the folding lever via a hinge point 34, upper link 36 being hinged to lid element 20 or, more precisely, a support frame of lid element 20 in a hinge point 38. To the rear of the folding lever comprising links 30 and 36, lid link assembly 26 comprises a four-joint linkage comprising two links 40 and 42, which are hinged to another part of main bearing 28 via hinge points 44 and 46 on one side and to lid element 20 or, more precisely, to the support frame of lid element 20 via hinge points 48 and 50 on the other side. Lid element 20 is mounted in a pivoting manner on the support frame, which is designed as a tubular frame, for example, in order to form a trunk lid.

Displacement means 22 additionally comprises an electric motor 52, which is mounted on main bearing 28 in a fixed manner and has lid link assembly 26 and a locking assembly 54, which comprises a claw-like locking hook 56, which interacts with a peg or a mating locking element 58, which is disposed on the underside of lid element 20 or of the support frame of lid element 20. Locking hook 56 is mounted on an arm of main bearing 28 pointing in the direction of the vehicle front in such a manner that locking hook 56 can pivot in a pivot point 60 and is connected to an intermediate link 64 via a hinge point 62, intermediate link 64 being connected to a triangular link 68 via a hinge point 66, triangular link 68 being mounted on main bearing 28 in such a manner that it can pivot in a pivot point 70. Additionally, a drive rod 74 is hinged to triangular link 68 via a hinge point 72, drive rod 74 extending along the arm of main bearing 28 pointing in the direction of the vehicle front and being hinged to a coupling link 78 via a hinge point 76 at its end facing away from triangular link 68, coupling link 78 being connected for co-rotation to a coupling wheel 80, which is designed as a spur wheel and whose axis of rotation coincides with the pivot axis formed by hinge point 32 of link 30. Coupling wheel 80 engages a drive pinion 82, which is driven by electric motor 52. Coupling link 78 and drive rod 74 are part of a locking link assembly. Furthermore, a stop 84 is disposed on coupling wheel 80, stop 84 being designed as a peg and interacting with link 30 of lid link assembly 26 when in the stop position, as can be seen in particular in FIGS. 4 and 5.

Described top compartment lid assembly 18, which is illustrated in particular in FIGS. 2 to 8, works in the manner described below.

Figure 3:
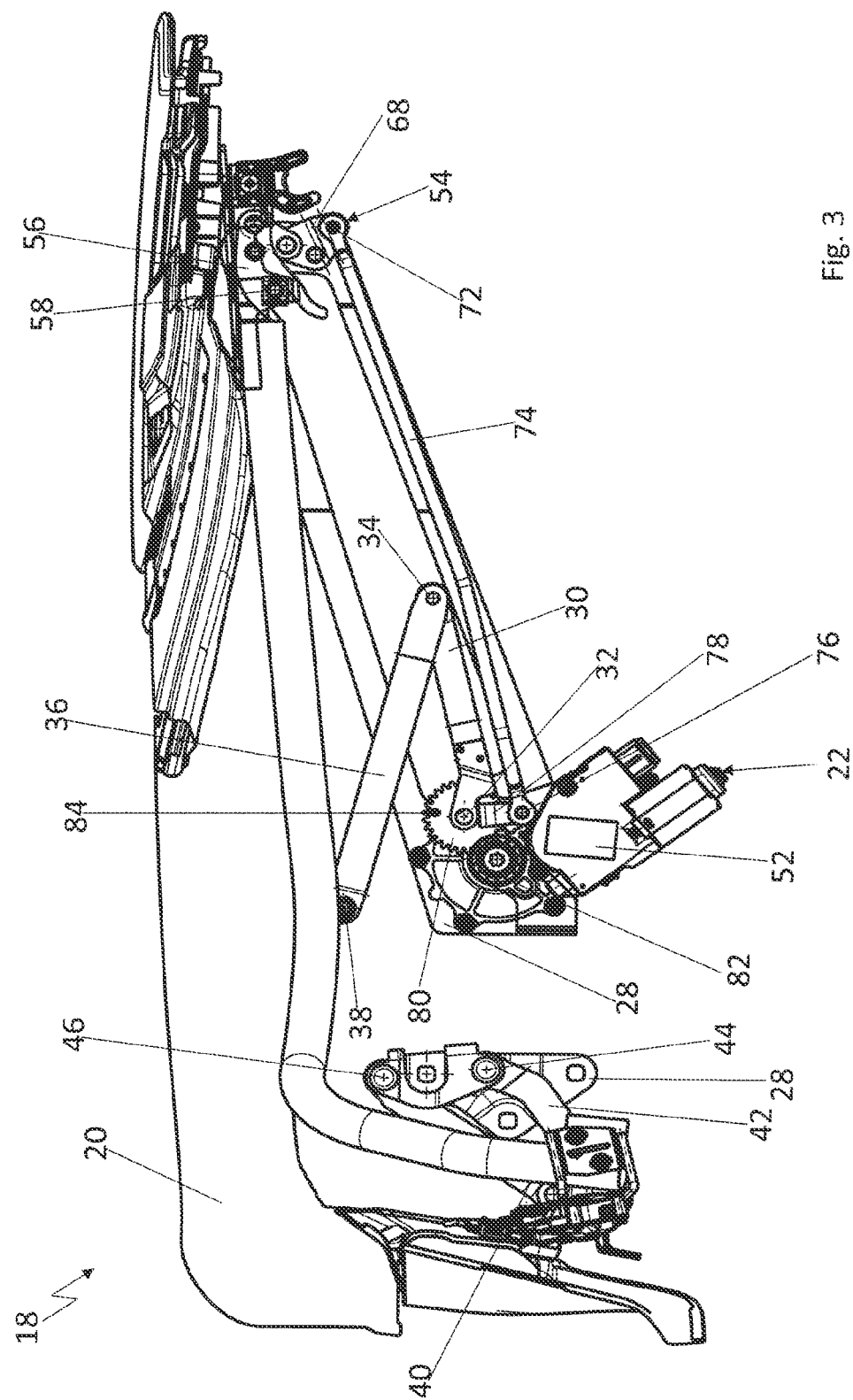
FIG. 3 is an interior view of the top compartment lid assembly with a lid element in a closed position.
Figure 4:
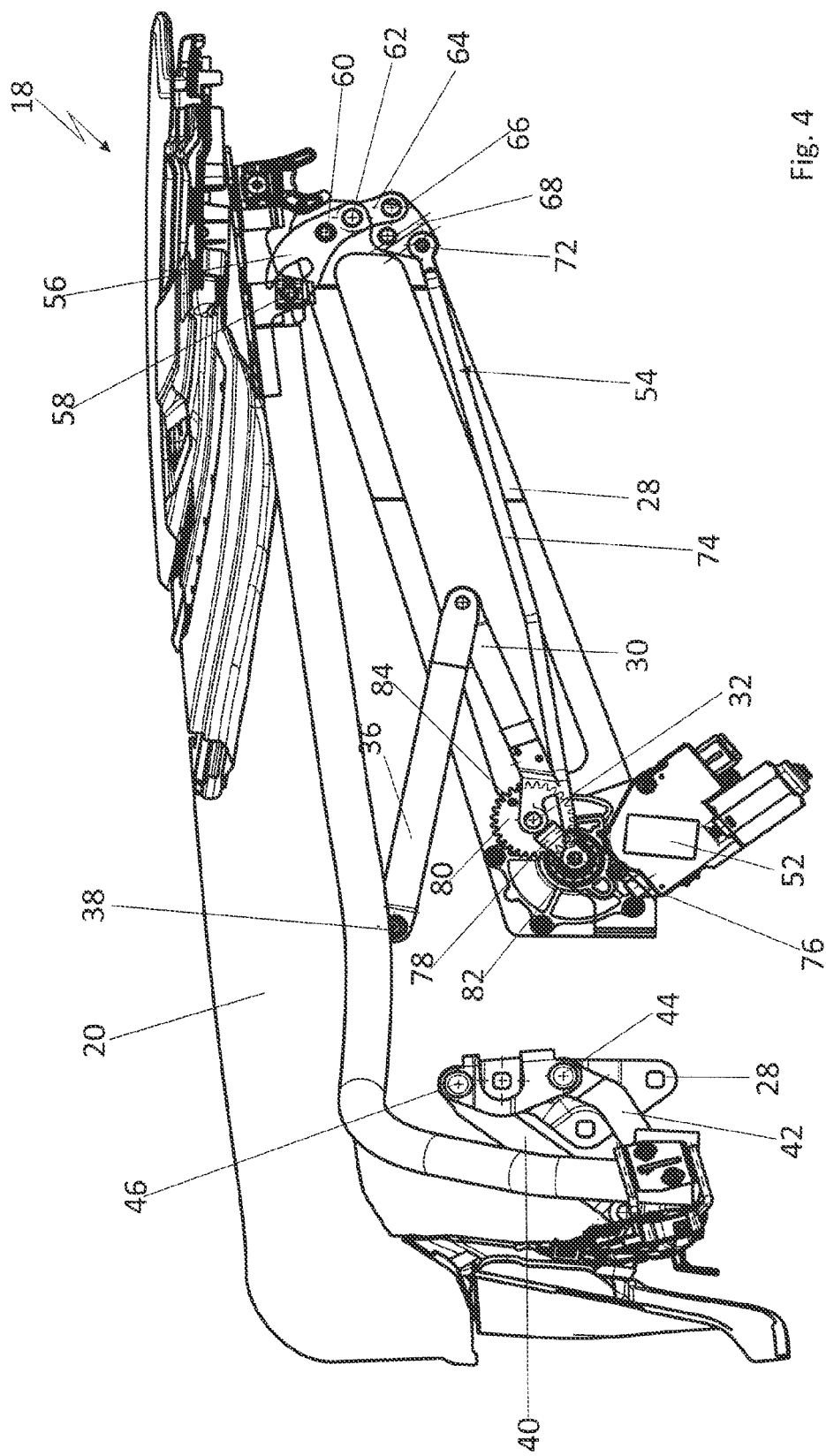
FIG. 4 is a view of the top compartment lid assembly essentially corresponding to FIG. 3, but for an unlocked position of a locking assembly.
Figure 5:
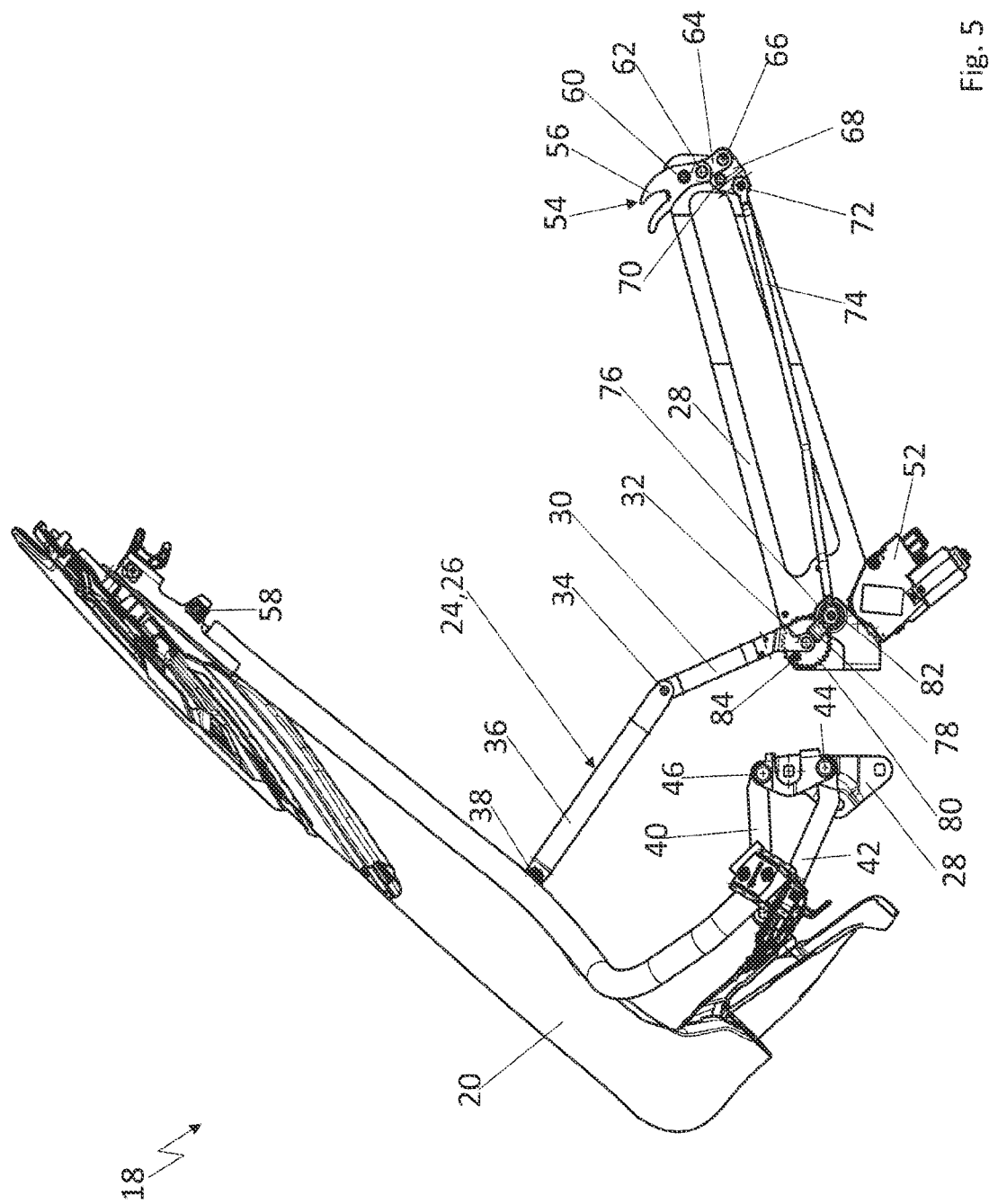
FIG. 5 is a view also essentially corresponding to FIG. 3, but for an open position of the lid element.

Starting from a closed position of lid element 20 (see FIGS. 3 and 6), electric motor 52 is moved with the result that drive pinion 82 rotates in the counterclockwise sense with respect to the illustration in FIGS. 3, 4 and 5. This causes coupling wheel 80 to rotate in the clockwise sense with respect to the illustration in FIGS. 2 to 5, thereby introducing a displacing movement into locking hook 56 via coupling link 78, drive rod 74, triangular link 68 and intermediate link 64 and locking hook 56 being disengaged from mating locking element 58 (see FIGS. 4 and 7). The shape of locking hook 56 causes lid element 20 to thus undergo a slight lifting motion. Locking assembly 54 is displaced until stop 84 strikes the upper side of link 30 of lid link assembly 26. Hinge point 76 between coupling link 78 and drive rod 74 is then located approximately in the axis of rotation of drive pinion 82.

If drive pinion 82 is now rotated further in the counterclockwise sense by means of electric motor 52 from the described unlocked position of locking hook 56, the unit composed of coupling wheel 80 and link 30 is pivoted about the pivot axis of drive pinion 82 synchronously with drive pinion 82, the straightening of the folding lever formed by links 30 and 36 causing lid element 20 to pivot into its open position (see FIGS. 2, 5 and 8). Coupling wheel 80 and link 30 form a rigid unit since stop 84 is in contact with link 30 and coupling wheel 80 consequently cannot rotate further about its axis of rotation. As can be seen in FIG. 5 in particular, locking hook 56, intermediate link 64 and triangular link 68 are now in an over-center position relative to each other, which means that locking hook 56 cannot unintentionally pivot into its locked position.

To displace lid element 20 from the open position into the closed position, electric motor 52 is operated in such a manner that drive pinion 82 rotates in the clockwise sense with respect to the illustration in FIGS. 3 to 5. This causes the unit composed of coupling wheel 80 and link 30 to also rotate in the clockwise sense about the axis of rotation of drive pinion 82. Once lid element 20 has reached its closed position, coupling wheel 80 is again driven by means of drive pinion 82, but now in the counterclockwise sense, which causes a thrust to act on drive rod 74 and locking hook 56 to engage mating locking element 58. Lid element 20 is thus secured in its closed position. In this position, too, locking hook 56, intermediate link 64 and triangular link 68 are in the over-center position relative to each other. Thus, external forces that may act on lid element 20 do not lead to a displacement of locking hook 56 into the unlocked position.

Many modifications and variations to this preferred embodiment will be apparent to those skilled in the art, which will be within the spirit and scope of the invention. Therefore, the invention should not be limited to the described embodiment. To ascertain the full scope of the invention, the following claims should be referenced.

REFERENCE SIGNS 10 convertible vehicle
12 top
14 vehicle interior
16 top storage space
18 top compartment lid assembly
20 lid element
22 displacement means
24 linkage assembly
26 lid link assembly
28 main bearing
30 link
32 hinge point
34 hinge point
36 link
38 hinge point
40 link
42 link
44 hinge point
46 hinge point
48 hinge point
50 hinge point
52 electric motor
54 locking assembly
56 locking hook
58 mating locking element
60 pivot point
62 hinge point
64 intermediate link
66 hinge point
68 triangular link
70 pivot point
72 hinge point
74 drive rod
76 hinge point
78 coupling link
80 coupling wheel
82 drive pinion
84 stop

What is claimed is:

1. A top compartment lid assembly of a convertible vehicle, the top compartment lid assembly comprising a lid element for a top storage space of the top compartment lid assembly in which the top storage space is for storing a top of the convertible vehicle, a linkage assembly configured to displace the lid element between an open position and a closed position and comprising a lid link assembly on either side of a vertical longitudinal center plane of the lid, each lid link assembly being mounted in a pivoting manner on a main bearing attached to a vehicle body, and a locking assembly on either side of the longitudinal center plane of the lid, each locking assembly being configured to be moved between a locked position and an unlocked position by a locking link assembly, characterized in that an electric motor is mounted on each of the bilaterally disposed main bearings, each electric motor driving both the respective lid link assembly and the respective locking link assembly via a drive pinion.

2. The top compartment lid assembly according to claim 1, wherein when the drive pinion is moved in a first direction of rotation, it first displaces the locking assembly from the locked position into the unlocked position and then displaces the lid element from the closed position into the open position, and when the drive pinion is moved in a second direction of rotation, it first displaces the lid element from the open position into the closed position and then displaces the locking assembly from the unlocked position into the locked position.

3. The top compartment lid assembly according to claim 1, wherein the drive pinion drives a coupling wheel connected to a drive rod of the locking link assembly.

4. The top compartment lid assembly according to claim 3, wherein the drive rod is connected to a link, driving a latch of the locking assembly.

5. The top compartment lid assembly according to claim 3, wherein a pivot axis between the drive rod and a coupling link connected to the coupling wheel coincides with an axis of rotation of the drive pinion when the locking assembly is in the unlocked position.

6. The top compartment lid assembly according to claim 3, wherein a link of the lid link assembly has a pivot axis which coincides with an axis of rotation of the coupling wheel.

7. The top compartment lid assembly according to claim 6, wherein the coupling wheel has a stop which interacts with the link of the lid link assembly.

8. The top compartment lid assembly according to claim 1, wherein the locking assembly is in an over-center position when in its un-locked position.

9. A convertible vehicle comprising a top compartment lid assembly according to claim 1.

10. The top compartment lid assembly according to claim 4, wherein the link is a triangular link.

11. A top compartment lid assembly of a convertible vehicle, the top compartment lid assembly comprising a lid element, a linkage assembly configured to displace the lid element between an open position and a closed position and comprising a lid link assembly on either side of a vertical longitudinal center plane of the lid, each lid link assembly being mounted in a pivoting manner on a main bearing attached to a vehicle body, and a locking assembly on either side of the longitudinal center plane of the lid, each locking assembly being configured to be moved between a locked position and an unlocked position by a locking link assembly, characterized in that an electric motor is mounted on each of the bilaterally disposed main bearings, each electric motor driving both the respective lid link assembly and the respective locking link assembly via a drive pinion;

wherein when the drive pinion is moved in a first direction of rotation, it first displaces the locking assembly from the locked position into the unlocked position and then displaces the lid element from the closed position into the open position, and when the drive pinion is moved in a second direction of rotation, it first displaces the lid element from the open position into the closed position and then displaces the locking assembly from the unlocked position into the locked position.

12. A top compartment lid assembly of a convertible vehicle, the top compartment lid assembly comprising a lid element, a linkage assembly configured to displace the lid element between an open position and a closed position and comprising a lid link assembly on either side of a vertical longitudinal center plane of the lid, each lid link assembly being mounted in a pivoting manner on a main bearing attached to a vehicle body, and a locking assembly on either side of the longitudinal center plane of the lid, each locking assembly being configured to be moved between a locked position and an unlocked position by a locking link assembly, characterized in that an electric motor is mounted on each of the bilaterally disposed main bearings, each electric motor driving both the respective lid link assembly and the respective locking link assembly via a drive pinion;

wherein the drive pinion drives a coupling wheel connected to a drive rod of the locking link assembly; and wherein a pivot axis between the drive rod and a coupling link connected to the coupling wheel coincides with an axis of rotation of the drive pinion when the locking assembly is in the unlocked position.

* * * * *